US012644844B2

(12) United States Patent
Sahiri

(10) Patent No.: US 12,644,844 B2
(45) Date of Patent: Jun. 2, 2026

(54) IMMERSION PROBE HAVING VARIABLE PATH LENGTH

(71) Applicant: Implen GmbH, Munich (DE)

(72) Inventor: Thomas Sahiri, Calabasas, CA (US)

(73) Assignee: Implen GmbH, Munich (DE)

( * ) Notice: Subject to any disclaimer, the term of this patent is extended or adjusted under 35 U.S.C. 154(b) by 30 days.

(21) Appl. No.: 18/692,749

(22) PCT Filed: Sep. 19, 2022

(86) PCT No.: PCT/EP2022/075984
§ 371 (c)(1),
(2) Date: Mar. 15, 2024

(87) PCT Pub. No.: WO2023/041787
PCT Pub. Date: Mar. 23, 2023

(65) Prior Publication Data
US 2024/0361251 A1 Oct. 31, 2024

(30) Foreign Application Priority Data

Sep. 20, 2021 (DE) ..................... 10 2021 210 443.6

(51) Int. Cl.
*G01N 21/85* (2006.01)
(52) U.S. Cl.
CPC ................................ *G01N 21/8507* (2013.01)
(58) Field of Classification Search
CPC .......... G01N 21/8507; G02B 27/10–16; G02B 5/04–06
See application file for complete search history.

(56) References Cited

U.S. PATENT DOCUMENTS 5,077,481 A 12/1991 Hoult
5,168,367 A * 12/1992 O'Rourke .......... G01N 21/0303
250/576

(Continued)

FOREIGN PATENT DOCUMENTS

DE 10037778 A1 2/2002
DE 102010062268 A1 6/2012

(Continued)

*Primary Examiner* — Michelle M Iacoletti
*Assistant Examiner* — Roberto Fabian, Jr.
(74) *Attorney, Agent, or Firm* — Rutan & Tucker LLP

(57) ABSTRACT

An immersion probe (1) for the quantitative and/or qualitative analysis of a fluid (F), e.g., a liquid or a gas, using light which is guided through the fluid (F) along a light path (L), comprising a measuring head (10) suitable for immersion in the fluid, having an input light guide (14) for the light guided to the fluid (F), which input light guide can be connected to a light source, and an output light guide (15) for the light guided out of the fluid (F), which output light guide can be connected to a detector, a first and a second optical window, the mutually facing faces of which are in contact with the fluid, and at least one light deflection device (17, 18), which is arranged in the light path of the light exiting the input light guide (14) and entering the output light guide (15) and deflects the light coming from the input light guide (14) through the first optical window into the fluid and deflects the light coming from the fluid to the output light guide (15). The immersion probe is characterized in that the first and the second optical window (20, 21) are arranged with respect to each other in a wedge shape, and their surfaces (20*a*, 21*a*) pointing toward the interior of the V face the fluid (F) to be analyzed, the at least one light deflection device (17, 18) and the optical windows (20, 21**) being able to move back and forth relative to each other substantially in the direction of the opening of the V.

15 Claims, 5 Drawing Sheets

Long path

(56)     References Cited

U.S. PATENT DOCUMENTS

| | | | | |
|---|---|---|---|---|
| 5,185,834 | A | 2/1993 | Day et al. | |
| 5,418,614 | A | 5/1995 | Brost et al. | |
| 8,908,184 | B2 * | 12/2014 | Bernhard | G01N 21/8507 |
| | | | | 356/432 |
| 10,082,462 | B2 * | 9/2018 | Suzuki | G01N 21/8507 |
| 10,976,259 | B2 | 4/2021 | Owen | |
| 2004/0086214 | A1 | 5/2004 | Huang et al. | |
| 2008/0123094 | A1 | 5/2008 | Juhl | |
| 2016/0186123 | A1 * | 6/2016 | Nanba | C12M 23/26 |
| | | | | 435/325 |

FOREIGN PATENT DOCUMENTS

| | | | |
|---|---|---|---|
| DE | 102017122125 | A1 | 3/2018 |
| EP | 3318715 | A1 | 5/2018 |
| EP | 3045521 | B1 | 1/2019 |
| JP | H04332852 | A | 11/1992 |
| WO | 9612174 | A1 | 4/1996 |
| WO | 2017068339 | A1 | 4/2017 |
| WO | 2021067565 | A1 | 4/2021 |

* cited by examiner

Long path

Short path

IMMERSION PROBE HAVING VARIABLE PATH LENGTH

PRIORITY

This application is a U.S. national stage application of International Application No. PCT/EP2022/075984, filed Sep. 19, 2022, which claims priority to DE 10 2021 210 443.6, filed Sep. 20, 2021, each of which is incorporated by reference in its entirety into this application.

TECHNICAL FIELD

The present invention relates to the field of immersion probes for the quantitative and/or qualitative analysis of a fluid, e.g., a liquid or a gas, using light which is guided through the fluid along a light path. In particular, the invention relates to an immersion probe having a variable path length.

PRIOR ART

Immersion probes are used, among other things, for monitoring biochemical and chemical reactions. The areas of application are predominantly in production quality control and in the study of biochemical/chemical reaction mechanisms by monitoring reactants, products, and possible intermediate molecules as part of investigations into the reaction process. The spectral information is obtained directly in the reaction vessels and transmitted to a spectrophotometer via optical fibers. The technology is non-destructive, interference-free, saves time and money, and helps to avoid manual/human-induced errors.

In the field of immersion probes, it is accordingly known to determine the presence and/or the concentration of a constituent of a fluid by analyzing the light transmitted through the fluid. In this case, the light is first guided through the fluid and then to a spectrometer, in which the light transmitted through the fluid is analyzed using absorption spectroscopy, for example. The constituent being searched for can then be identified, or its concentration in the fluid determined, from the spectra. Immersion probes of this kind are known, for example, from U.S. Pat. Nos. 5,077,481 A or 5,418,614 A.

In these known immersion probes, the light from a light source is introduced into the immersion probe by means of light guides and is coupled into a sample compartment formed in the immersion probe, the fluid under analysis being located in said sample compartment or being able to pass therethrough. The peripheral surfaces of the sample compartment that are located in the beam path, for example optical windows, lenses, or the like, define various fixed measurement parameters, in particular a fixed path length of the light through the fluid to be analyzed, that are important for evaluating the signal.

Immersion probes of this kind having a fixed path length are disadvantageous in that the measurement is performed on the basis of only one set of parameters required for the measurement. As mentioned, these parameters include primarily the path length of the measurement light (signal light or excitation light) through the fluid (generally a liquid but gases are also conceivable). In other words, in conventional immersion probes the spectral intensity of the light that is transmitted through the sample is determined as a function of only one path length (with the help of a calibration, which is also carried out using just one path length). This restricts the dynamic measurement range, which can lead to non-linearities, in particular close to the saturation limit.

Moreover, accurately maintaining the path length during the measurement is vital for an accurate quantitative analysis of the fluid constituent being searched for, and so deviations in the path length during the measurement or between measurements affect the accuracy of the measurement result and thus the reliable quantitative determination of the constituent being searched for. When the path lengths are relatively long, deviations therefrom may be of little significance; however, particularly when the fluid contains high concentrations of the constituent being searched for, relatively small path lengths have to be used, in which even only slight deviations therefrom may render the measurement result non-linear and thus impair the accuracy of the analysis.

An immersion probe in which the path length can be changed using a plurality of sample chambers of different sizes, each one placed individually on the probe body (measuring head), is known from US 2004/0086214 A1. An immersion probe in which the path length can be adjusted by selecting different spacers between the light guides and a reflector is known from U.S. Pat. No. 5,185,834 A. In both immersion probes, however, the path length cannot be adjusted or varied while measurements are being taken in the fluid, and so each separate measurement is affected by the aforementioned problem, i.e., the use of just one path length for evaluating the recorded spectra. The reason for this is that, if in said prior art documents the sample chambers or spacers are replaced, it is not only the path length that changes, but other parameters change, too, such as the optical properties of the light-transmitting surfaces, so that the different results cannot be integrated without introducing further inaccuracies or errors into the measurement result.

WO 96/12174 A1 discloses an immersion probe in which the light guides and a lens mounted thereon, which together with a reflector defines the sample compartment, are adjusted axially in relation to the light guides and the reflector between a first and a second position with respect to said reflector, thereby implementing two different path lengths. In this case, the first path length is used for generating a reference signal and the second path length is used for generating an analysis signal.

WO 21/067565 A1, U.S. Pat. No. 10,976,259 B, or DE 10 2017 122125 A1 disclose immersion probes that are similar in principle to the aforementioned WO'174 and in which an optical fiber or focusing lenses are displaced with respect to the back wall of the sample compartment in order to achieve different path lengths.

An immersion probe in which the tips of the light guides emitting the excitation light and receiving the signal light can be displaced relative to each other in order to vary the path length is known from EP 3 318 714 A1.

EP 3 045 521 B1 and EP 3 365 658 A1 disclose, respectively, immersion probes in which prisms and insertable optical windows having stepped surfaces define different but fixed path lengths.

In all these constructions, the disadvantage is that the optical surfaces delimiting the sample compartment are oriented perpendicularly to the optical axis, and so reflections occur in the beam path which lead to the light being transmitted multiple times through the fluid to be analyzed and distort the signal. In addition, in immersion probes having curved mirrors, the light is transmitted through the fluid in the sample compartment at different angles and the focus changes position in relation to one or both of the optical surfaces delimiting the sample compartment, which likewise results in the measurement accuracy being affected.

SUBJECT MATTER OF THE INVENTION

In view of these above-mentioned disadvantages, an object of the invention is to provide an immersion probe that allows the measurement accuracy to be improved when quantitatively and/or qualitatively analyzing a fluid, for example a liquid or a gas, using light. Another object is to provide an immersion probe that has as simple a design as possible and allows spectra to be recorded automatically along variable path lengths.

This object is achieved by the subject matter of claim 1 and of independent claim 14. The dependent claims set out preferred embodiments of the invention.

According to the invention, in a first aspect, an immersion probe is provided for the quantitative and/or qualitative analysis of a fluid, e.g., a liquid or a gas, using light which is guided through the fluid along a light path, comprising a measuring head having an input light guide for the light guided to the fluid, which input light guide is connectable to a light source, and an output light guide for the light guided out of the fluid, which output light guide is connectable to a detector, a first and a second optical window, with their mutually facing surfaces being in contact with the fluid, and at least one light deflection device, which is arranged in the light path of the light exiting the input light guide or entering the output light guide and which deflects the light coming from the input light guide to pass through the first optical window into the fluid or deflects the light coming from the fluid towards the output light guide, characterized in that the first and second optical windows are arranged with respect to each other in a wedge shape (V shape), their surfaces pointing toward the interior of the wedge facing the fluid to be analyzed, the at least one light deflection device and the optical windows being able to move back and forth relative to each other substantially in the direction of the opening of the wedge.

The optical windows arranged in a wedge shape (V shape) thus define two sides of a sample compartment that contains the fluid and through which the light enters or exits the fluid to be analyzed along the light path. If the light deflection device and the optical windows are now moved with respect to each other substantially in the direction of the opening of the wedge (V), as is preferably effected continuously during a measurement, the position at which the light hits the optical windows in the vertical direction or in the direction of the wedge (V) changes. The light deflected by the light deflection device thus hits different locations of the first and second optical windows. Since the at least one light deflection device is movable in this way, the light transmitted through the fluid also always hits a light deflection device, so that no alignment of the light deflection device is needed during operation, or only needs to be effected once (for example at the factory). In this case, a movement substantially in the direction of the opening of the wedge (V) should be construed as a movement in which at least one directional component of the movement is parallel to the bisector of the optical windows arranged in a wedge shape (V shape) (or the movement is not perpendicular to the bisector). The result of the relative movement according to the invention is that the path length of the light between the two windows also changes, i.e., the path length of the light through the fluid to be analyzed in the sample compartment changes. Thus, in the simplest way, namely merely by a simple relative movement of the at least one light deflection device in relation to the optical windows, the path length through the fluid can be changed in a controllable manner, such that spectra can be recorded preferably continuously using different path lengths in each case.

The immersion probe according to the invention is thus based on the premise of recording the spectra in a plurality of path lengths and thus determining the gradient of the function $I(x)$, i.e., of the intensity $I$ as a function of the path length $x$, in order to achieve significantly higher measurement accuracy. In other words, owing to spectra being recorded in different path lengths, the invention thus makes it possible to provide a considerably broader dynamic measurement range by comparison with conventional probes having a fixed path length. In addition, for example, concentrations of constituents of the fluid can be determined precisely by determining the absorbance on the basis of various path lengths.

A further advantage of this arrangement is that owing to the simple geometry of the wedge shape (V shape), which allows the angle of the V to be accurately known, the change in the path length through the fluid can be determined from the length of the movement (adjustment) of the light deflection device.

Lastly, the V-shaped arrangement of the windows is advantageous in that the light entering and/or exiting the sample compartment is transmitted through each window not normally (i.e., at an angle of incidence of 0°) but rather at an angle of incidence of >0°. This prevents light reflected (once or multiple times) at the optical boundary surfaces of at least one window from remaining in the light path (beam path) and leading to the light passing through the fluid multiple times in an undesirable manner, which affects the measurement result.

The optical windows arranged in a wedge shape (V shape) can be in contact with each other or connected and, in the process, form an optical surface, extending continuously in a wedge shape (V shape), for the entry and exit of the light into and out of the fluid. If the light deflection device is now moved such that the light path is shifted toward the tip of the V, even minute path lengths can be achieved, as are needed for analyzing highly absorptive constituents in a fluid.

In one embodiment, the first or the second optical window is arranged such that the light is incident thereon substantially normally. For example, the first or the second optical window can be arranged in parallel with the movement direction of the at least one light deflection device relative to the optical windows.

In a preferred embodiment, the optical windows arranged with respect to each other in a wedge shape (V shape) are provided in the measuring head in such a way that the bisector of the V is parallel to the movement direction of the at least one light deflection device relative to the optical windows.

In a further embodiment, a reflector is provided downstream of the second optical window in the light path and reflects the light, which has passed through the fluid, back through the second optical window, through the fluid and the first optical window, to the at least one light deflection device. The immersion probe thus makes use of the reflection to let the light pass through the fluid again, thereby doubling the path length by comparison with when the light passes through the fluid once. The light that has passed through the fluid and been reflected is coupled into the output light guide by the at least one light deflection device, which is suitable for deflecting both the excitation light and the signal light.

Preferably, the at least one light deflection device comprises a first and a second deflection device. In this case, the first light deflection device is used for deflecting the light coming from the input light guide through the first window into the fluid, and the second light deflection device is used for deflecting the light, which has passed through the fluid, into the output light guide.

Preferably in this regard, the second light deflection device is arranged downstream of the second optical window in the light path and deflects the light, which has emerged from the fluid through the second optical window, to the entrance to the output light guide. In this embodiment, therefore, the immersion probe is configured for the light to pass through the fluid once, said light then being deflected to the output light guide by the second deflection device and coupled into said output light guide. Since the second light deflection device (downstream of the second optical window in the light path) can move relative to the optical windows together with the first light deflection device (upstream of the first optical window), the light that has passed through the fluid constantly hits the second light deflection device, even when the path length of the light through the fluid changes.

In a variant of this embodiment, a switching mechanism is provided, by means of which the reflector can be arranged between a position in the light path downstream of the second optical window and upstream the second light deflection device and a position outside said light path. This allows the immersion probe to be switched between a measurement in which the light passes through the fluid once and a measurement in which it does so twice.

Preferably in this case, the reflector can move together with the light deflection devices. In this way, the relative position and orientation between the first light deflection device, the reflector, and the second light deflection device constantly remains the same.

Depending on the arrangement, the first and the second light deflection device can be arranged on the side of the first optical window, for example when the immersion probe has a reflector that lets the light pass through the fluid twice, or the first light deflection device is arranged on the side of the first window and the second light deflection device is arranged on the side of the second window such that it can deflect light that has passed through the fluid once to the output light guide. According to the invention, however, further light deflection devices can also be provided, for example two on the first-window side and one on the second-window side. In any case, a person skilled in the art can determine whether one light deflection device for deflecting the excitation light from the input light guide and also for deflecting the signal light to the output light guide should be provided on the first-window side, or whether two separate light deflection devices should be used for this purpose, for example a first light deflection device for deflecting the excitation light and a second light deflection device for deflecting the signal light.

In a preferred embodiment, the immersion probe comprises one or more lenses for optimally focusing the excitation light along the light path. In this case, the lens(es) can particularly preferably be arranged at the exit of the input light guide and/or at the entrance of the output light guide. Also conceivable is an arrangement on the light deflection devices, either instead of or in addition to the above arrangement. On the other hand, for the purpose of optical focusing, the light deflection device(s) can also be configured as concave mirrors so that the lenses can be foregone.

Preferably, the immersion probe comprises an adjustment device, which is operatively connected to the light deflection devices and can move the light deflection devices, preferably in parallel with the bisector of the V. This adjustment device is preferably also operatively connected to the optional reflector.

The output and input light guides are generally fixed in place in the measuring head. However, it is also conceivable for the input and output light guides to be moved together with the at least one light deflection device. For this purpose, the light guides can be connected to the adjustment device.

Advantageously, the adjustment device comprises a motor, particularly preferably a stepper motor, a threaded rod coupled to a shaft of the motor, and a threaded nut, which is coupled to the light deflection devices and in which the threaded rod engages. Thus, in combination with the motor, in particular the stepper motor, extremely accurate adjustment movements of the light deflection devices can be achieved. In this case, the threaded nut can be fixedly integrated in a holding arrangement of the light deflection devices that holds the light deflection devices.

According to an alternative configuration, a linear motor directly coupled to the light deflection devices is also possible as an adjustment device.

It is also possible, though not essential, for the immersion probe to have an electronic controller of the adjustment device. However, it is preferable for the adjustment device to be controllable from outside the immersion probe. For this purpose, the adjustment device can preferably be coupled to a detector, e.g., a spectrometer or a spectrophotometer, or a computer, which provides an electronic controller of the adjustment device.

The sample compartment delimited along the light path by the optical windows arranged in a wedge shape (V shape) is preferably open so that fluid can flow through the sample compartment. However, it is also conceivable for the sample compartment to be configured in a closable or closed manner so as to hold a defined amount of fluid.

The light for exciting the fluid in the sample compartment is preferably light in the UV, VIS (visible), or IR range.

The at least one light deflection device is preferably a deflecting prism that is suitable for deflecting the light coming from the input light guide through 90° to the first optical window into the fluid and to deflect the light coming from the fluid through 90° to the output light guide. However, it is also conceivable to have deflecting mirrors, e.g., planar or concave mirrors, as a light deflection device. In addition, the light deflection device can be a bent light guide, separate from or part of the input or output light guide, for example in the form of bent light guide ends.

In a preferred embodiment, the optical window, which preferably consists of quartz, constitutes an outer surface of the measuring head, said outer surface being in contact with the fluid to be analyzed.

According to the invention, in a second aspect, an immersion probe is provided for the quantitative and/or qualitative analysis of a fluid, e.g., a liquid or a gas, using light which is guided through the fluid along a light path, comprising a measuring head that is suitable for immersion in the fluid, having an input light guide for the light guided to the fluid, which input light guide can be connected to a light source, and an output light guide for the light guided out of the fluid, which output light guide can be connected to a detector, an optical window and a reflector, the mutually facing surfaces of which are in contact with the fluid, at least one first light deflection device, which is arranged in the light path of the light exiting the input light guide and entering the output light guide and deflects the light coming from the input light guide through the first optical window into the fluid and deflects the light coming from the fluid to the output light guide, the reflector being suitable for reflecting the light, which has passed through the fluid, back through the fluid and the optical window to the light deflection device or to the second light deflection device, characterized in that the optical window and the reflector are arranged with respect to each other in a wedge shape (V shape), and their surfaces pointing toward the interior of the V face the fluid to be analyzed, the at least one light deflection device on the one hand and the optical window and the reflector on the other hand being able to move back and forth relative to each other substantially in the direction of the opening of the V.

In this case (i.e., by comparison with the first aspect of the invention), the optical window and the reflector define the two sides of a sample compartment containing the fluid. If the light deflection device on the one hand and the optical window and the reflector on the other hand are now moved relative to each other substantially in the direction of the opening of the V, again as can preferably continually occur during a measurement, the position at which the light hits the optical window or the reflector in the vertical direction or in the direction of the V is changed. The light deflected by the light deflection device thus hits different points of the optical window or the reflector. Since the at least one light deflection device is movable, the light that has passed through the fluid and been reflected also constantly hits the light deflection device, and so no orientation is needed during operation, or is only needed once (for example at the factory). In this case, a movement substantially in the direction of the opening of the V should be construed as a movement in which at least one directional component of the movement is parallel to the bisector of the optical windows arranged in a wedge shape (V shape) (or the movement is not perpendicular to the bisector). The result of the relative movement according to the invention is that the path length of the light between the optical window and the reflector also changes, i.e., the path length of the light through the fluid to be analyzed in the sample compartment changes. Thus, in the simplest way, namely merely by a simple relative movement of the light deflection device in relation to the optical window and the reflector, the path length through the fluid can be changed in a controllable way, such that spectra can be recorded preferably continuously using different path lengths in each case.

As in the first aspect, the immersion probe of the second aspect is based on the premise of recording the spectra in a plurality of path lengths and thus determining the gradient of the function I(x), i.e., of the intensity I as a function of the path length x, in order to achieve significantly higher measurement accuracy. The further advantages of the first aspect, for example the significantly broader dynamic measurement range by comparison with conventional probes having a fixed length, precise determinations of concentrations of constituents of the fluid by way of the absorbance on the basis of different path lengths, and the accurate determination of the change in the path length owing to the angle of the V and the length of the movement (adjustment) of the light deflection devices being known, are also achieved.

In this second aspect too, the V-shaped arrangement of the optical window and the reflector is advantageous in that the light entering and/or exiting the sample compartment passes through each window not normally (i.e., at an angle of incidence of 0°) but rather at an angle of incidence of >0°. This prevents undesirable reflections in the light path (beam path).

The optical window and the reflector can be in contact with each other or connected. If the light deflection device is now moved such that the light path is shifted toward the tip of the V, even minute path lengths can be achieved, as are needed for analyzing highly absorptive constituents in a fluid.

In a preferred embodiment, the reflector is arranged such that the light is incident thereon substantially normally. For example, the reflector can be arranged in parallel with the movement direction of the light deflection device.

Preferably, the immersion probe comprises an adjustment device, which is operatively connected to the at least one light deflection device and can move the at least one light deflection device.

As is also the case in the embodiments having two optical windows, in this aspect, in which an optical window forms an angle of the V with a reflector, the at least one light deflection device can comprise a first and a second deflection device, which in this case are arranged on the side of the first optical window.

BRIEF DESCRIPTION OF THE DRAWINGS

Hereinafter, the immersion probe according to the invention will be described with reference to the accompanying drawings, which show embodiments of the present invention merely by way of example and in a non-limiting manner:

FIG. 9b is a sectional view along the line C-C in FIG. 9a, FIG. 9c is the plan view associated with FIG. 9a, FIG. 10a is a sectional view of a further aspect of the immersion probe according to the invention in a state corresponding to FIG. 1 having a short path length through the fluid to be analyzed (sectional plane B-B in FIG. 10c), FIG. 10b is a sectional view along the line D-D in FIG. 10a, FIG. 10c is the plan view associated with FIG. 10a.

DESCRIPTION OF THE PREFERRED EMBODIMENT

Figures 1, 2:
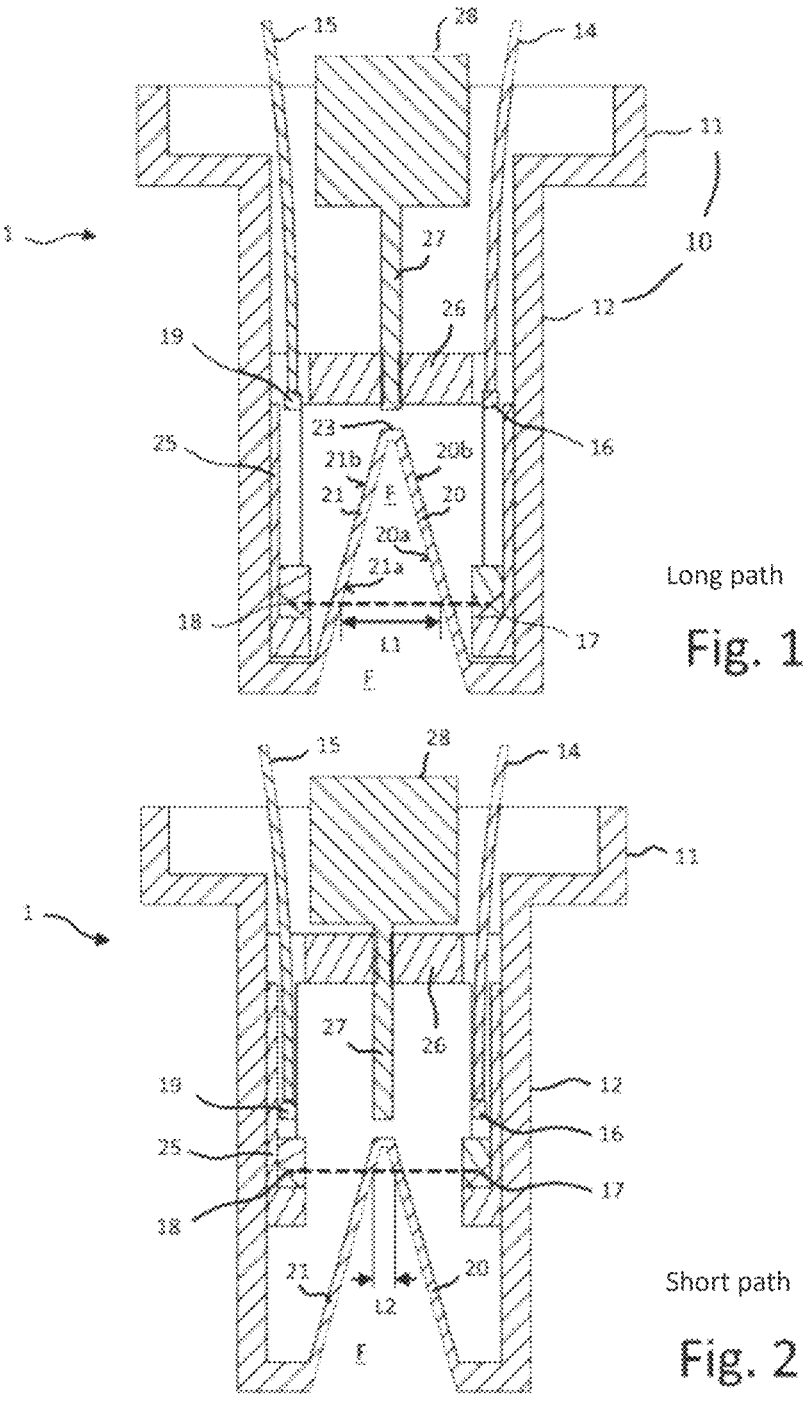
FIG. 1 is a sectional view of a first embodiment of the immersion probe according to the invention, in which the light deflection devices have been adjusted or moved in relation to the optical windows, which are arranged with respect to each other in a wedge shape (V shape), in such a way as to produce a long path length through the fluid to be analyzed.
FIG. 2 is a sectional view corresponding to FIG. 1 but in which the light deflection devices have been adjusted or moved in relation to the optical windows, which are arranged with respect to each other in a wedge shape (V shape), in such a way as to produce a short path length through the fluid to be analyzed.

FIGS. 1 and 2 are vertical sectional views of a first preferred embodiment of the immersion probe 1 of the present invention. The directional indications used here are based on an immersion probe inserted into a fluid from above. The immersion probe 1 comprises a measuring head 10, which in this embodiment constitutes the housing of the immersion probe and has a substantially cylindrical (horizontal) cross section. Other cross-sectional shapes, such as square, rectangular, polygonal, irregular, etc., are also considered in this embodiment. The measuring head 10 is intended for insertion into a fluid, for example a liquid F. The fluid can be present in containers, pipelines, or even without any substantial boundaries. At its top end, the measuring head 10 of the immersion probe 1 has a flange 11, which is suitable for fastening to container walls or pipe walls. These walls, as well as fastening means preferably present on the flange 11, for example openings, are not shown here for the sake of simplicity.

A cylindrical shaft 12 adjoins the flange 11 at the bottom and is used for receiving an input light guide 14 and an output light guide 15, which can be configured as fiber optics, for example. At the opposite end of the shaft 12 to the flange 11, two optical windows 20, 21 arranged with respect to each other in a wedge shape (V shape) are arranged along the vertical longitudinal axis of the measuring head 10; the surfaces 20a and 21a of said optical windows directed toward the interior of the V face the fluid F and are in contact therewith. In the present embodiment example, the two optical windows 20, 21 are connected upwardly in the vertical direction to form the tip 23 of the V, which is located on the longitudinal axis of the measuring head. The bisector of the V is also located on the longitudinal axis of the measuring head. Between the optical windows 20, 21 there is a sample compartment P, in which the fluid F to be analyzed is located. However, it is also conceivable to have a V-shaped arrangement in which the tip is oriented downward in the vertical direction. In this case, the sample compartment could be (sealingly) delimited from the interior of the measuring head 10 upwardly by a wall arranged between the legs of the V.

By its end outside the measuring head 10, the input light guide 14 is connected to a light source not shown, which provides a light wavelength suitable for the spectroscopic analysis of the fluid. The other end of the input light guide 14 is secured in the shaft 12 of the measuring head 10, for example using conventional means such as bonding, screwing, etc.

At this other end of the input light guide 14, there is a lens 16, which bundles the excitation light coming from the light source and conducts it to a light deflection device 17, a deflecting prism 17 in the present embodiment, which deflects the light path of the excitation light through 90° toward the optical window 20 of the windows 20, 21 arranged in a wedge shape (V shape).

In the process, the excitation light hits the surface 20b of the optical window 20 directed toward the exterior of the V at a non-normal angle of incidence (>0°), so that any reflections, which make up a minor but non-negligible proportion of the input light power, can be deflected out of the light path and cannot affect the measurement result.

Next, the light passes through the surface 20a of the optical window 20 directed toward the interior of the V and through the fluid in the sample compartment P. On the other side of the light path L (L1, L2) through the sample compartment P, the light passes through the other optical window 21 and reaches the light deflection device 18, which is also preferably a deflecting prism 18. This deflecting prism deflects the light, which has passed through the fluid F, to a lens 19 that is attached to the bottom end of the output light guide 15. The top end of the output light guide 15, leading outward out of the measuring head 10, is connected to a detector not shown here, for example a spectrometer or a spectrophotometer, by means of which the light that has interacted with the fluid F can be analyzed spectroscopically.

The deflecting prisms 17, 18 can move back and forth in the direction of the opening of the V—in the present embodiment example in parallel with the bisector of the V and the longitudinal axis of the measuring head 10, as shown in FIGS. 1 and 2. For this purpose, the deflecting prisms 17, 18 are fastened in a mount 25, which is borne in the interior of the shaft 12 of the measuring head 10 in a movable and guided manner. The mount 25 comprises a threaded nut 26, which is engaged with a threaded rod that is connected to the shaft of a motor 28, a stepper motor 28 in the preferred embodiment example, for conjoint rotation.

FIG. 1 shows the immersion probe in a state in which the deflection devices (deflecting prisms) 17, 18 are located in a lower position in relation to the optical windows 20, 21 arranged in a wedge shape (V shape), such that the light path has to travel along a path length L1 ("long path") through the fluid F in the sample compartment P. In this state or position, the immersion probe 1 can be used for recording a spectrum of the fluid F to be analyzed, the signal intensity I(x) of which depends on the path length x, which is x=L1 in FIG. 1.

If, as shown in FIG. 2, the deflecting prisms 17, 18 are now moved upward in relation to the optical windows 20, 21 arranged in a wedge shape (V shape), for example by the motor 28 having been activated and the mount 25, and thus the deflecting prisms 17 and 18, having been raised by the combination of the threaded rod 27 and the threaded nut 26, the excitation light deflected by the deflecting prism 17 hits a different (in this case higher) point on the surface 20b of the optical window 20, passes through the fluid F in the sample compartment P along a path length L2 ("short path"), and exits the sample compartment through the optical window 21, after which it is deflected to the output light guide 15 via the deflecting prism 18 and is coupled into said output light guide via the lens 19. The output light guide conducts the light, which has passed through the fluid F to be analyzed, to a detector where a spectrum is recorded, the intensity I(x) thereof, which is dependent on the light path x, being recorded for a light path x=L2.

Thus, using the immersion probe according to the invention, it is possible to vary the path length of the excitation light through the fluid F located in the sample compartment P, in the present embodiment example from the path length x=L1 in FIG. 1 to the path length x=L2 in FIG. 2, by a simple movement, in the present example an adjustment movement, of the light deflection devices 17, 18. It goes without saying that the present immersion probe 1 is not limited to the two path lengths L1 and L2 shown, but rather all path lengths L1<x<L2 in between can be set in a targeted and continual manner.

For this purpose, a controller (not shown) arranged outside the measuring head 10 is preferably provided for the motor 28 and can perform a measurement in conjunction with the light source and the detector, and in the process can continually vary the path length.

Figures 3, 4:
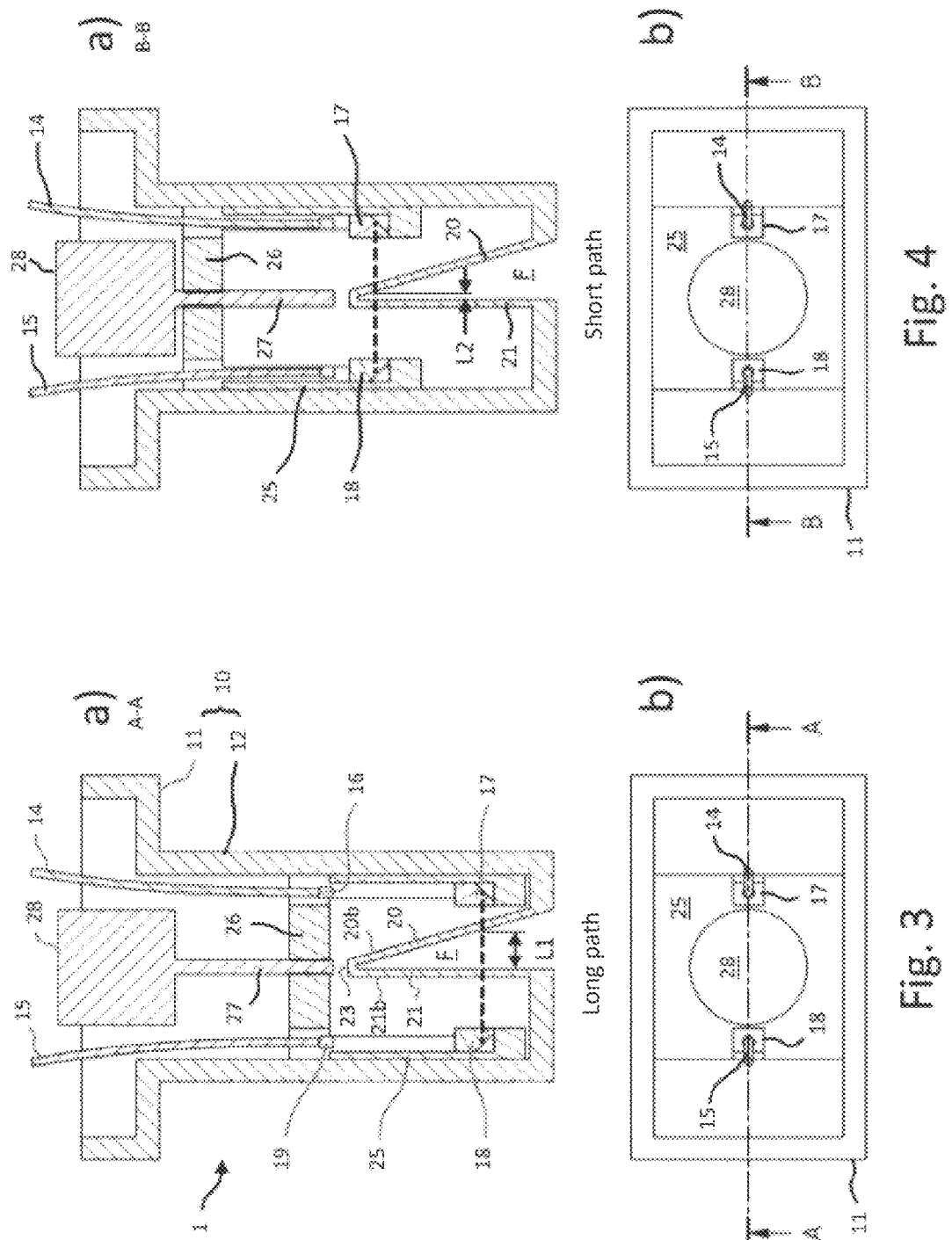
FIG. 3a is a sectional view of a second embodiment of the immersion probe according to the invention, in this case comprising an optical window on which the light is incident normally, in a state corresponding to FIG. 1 having a long path length through the fluid to be analyzed (sectional plane A-A in FIG. 3b)
FIG. 3b is the plan view associated with FIG. 3a, FIG. 4a is a sectional view of the second embodiment of the immersion probe according to the invention in a state corresponding to FIG. 2 having a short path length through the fluid to be analyzed (sectional plane B-B in FIG. 4b)
FIG. 4b is the plan view associated with FIG. 4a, FIG. 5a is a sectional view of a third embodiment of the immersion probe according to the invention, in this case comprising a movable reflector downstream of the second optical window, in a state corresponding to FIG. 1 having a long path length through the fluid to be analyzed (sectional plane A-A in FIG. 5c)

FIGS. 3a, b and 4a, b show a second embodiment of the immersion probe according to the invention. The construction of this immersion probe corresponds substantially to that of FIGS. 1 and 2, so the same elements are provided with the same reference numbers. The plan views in FIGS. 3b and 4b clearly show that the output and input light guides 14 and 15 are directed toward the deflecting prisms 17 and 18. In this embodiment, the second window 21 is arranged such that the light that has passed from the deflecting prism 17 through the first window 20 and through the fluid F is incident on the second window 21 normally. In this embodiment, the second window 21 is arranged such that it is parallel to the movement direction of the prisms 17, 18. In this case, the prisms are received in the mount 25, like before, and are moved by means of the adjustment device consisting of the motor 28, the threaded rod 27, and the threaded nut 26 attached to the mount 25.

Figures 5, 6:
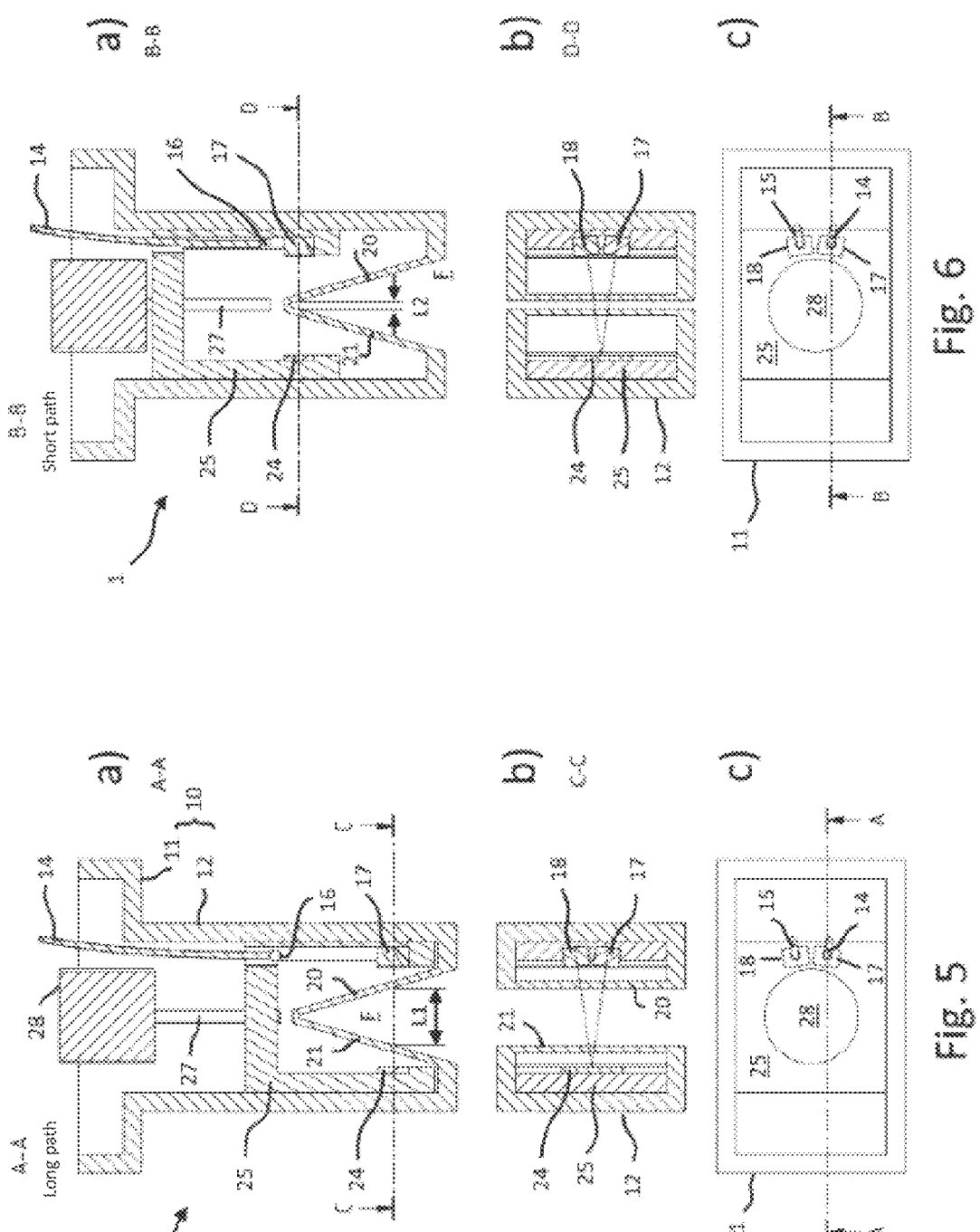
FIG. 5b is a sectional view along the line C-C in FIG. 5a, FIG. 5c is the plan view associated with FIG. 5a, FIG. 6a is a sectional view of the third embodiment of the immersion probe according to the invention in a state corresponding to FIG. 2 having a short path length through the fluid to be analyzed (sectional plane B-B in FIG. 6c)
FIG. 6b is a sectional view along the line D-D in FIG. 6a, FIG. 6c is the plan view associated with FIG. 6a, FIG. 7a is a sectional view of a fourth embodiment of the immersion probe according to the invention, in this case comprising a fixed reflector downstream of the second optical window, in a state corresponding to FIG. 1 having a long path length through the fluid to be analyzed (sectional plane A-A in FIG. 7c)

FIGS. 5a, b, c and 6a, b, c show a third embodiment of the immersion probe according to the invention. This embodiment retains the arrangement of the two optical windows from FIGS. 1 and 2, but in this case a reflector 24 is provided downstream of the second optical window 21 and reflects the light, which has passed through the fluid F, back through the second optical window 21, through the fluid F and the first optical window 20 again, to the second light deflection device (deflecting prism 18). In this embodiment example, this second light deflection device is arranged directly next to the first deflection device (deflecting prism 17) in the measuring head 10, on the same side of the first optical window 20. Like the deflecting prisms 17, 18, the reflector 24 is also fastened in the mount 25 and thus can be moved by means of the adjustment mechanism (motor 28, threaded rod 27, threaded nut 26) with respect to the optical windows.

In FIGS. 5b and 6b, which show the deflection devices 17, 18 and the reflector 24 in a first position (FIG. 5b) and a second position (FIG. 6b), it can be clearly seen how the light path through the fluid is shortened when moving from the first position to the second.

Figures 7, 8:
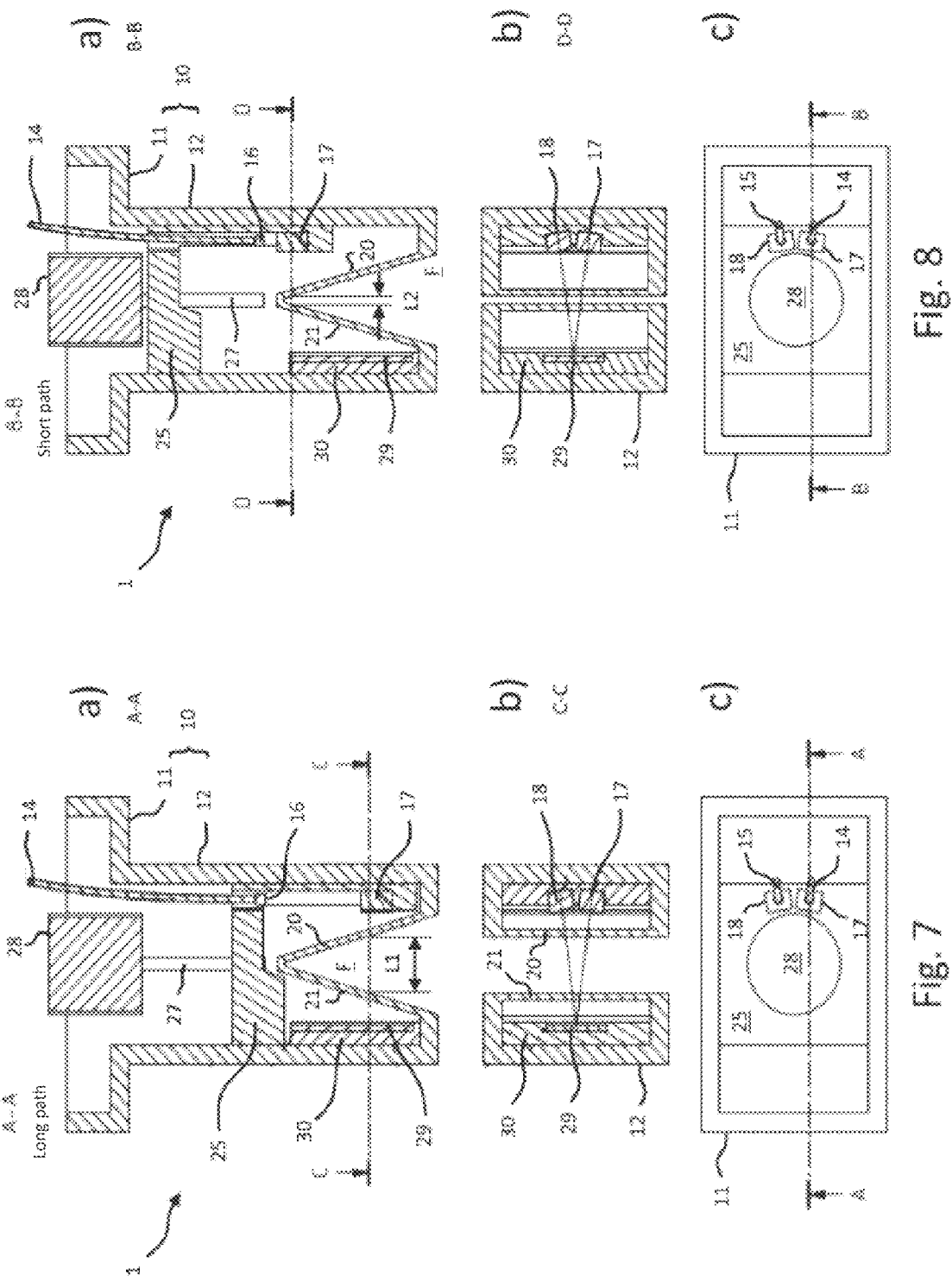
FIG. 7b is a sectional view along the line C-C in FIG. 7a, FIG. 7c is the plan view associated with FIG. 7a, FIG. 8a is a sectional view of the fourth embodiment of the immersion probe according to the invention in a state corresponding to FIG. 2 having a short path length through the fluid to be analyzed (sectional plane B-B in FIG. 8c)
FIG. 8b is a sectional view along the line D-D in FIG. 8a, FIG. 8c is the plan view associated with FIG. 8a, FIG. 9a is a sectional view of a further aspect of the immersion probe according to the invention in a state corresponding to FIG. 1 having a long path length through the fluid to be analyzed (sectional plane A-A in FIG. 9c)
Figures 9, 10:
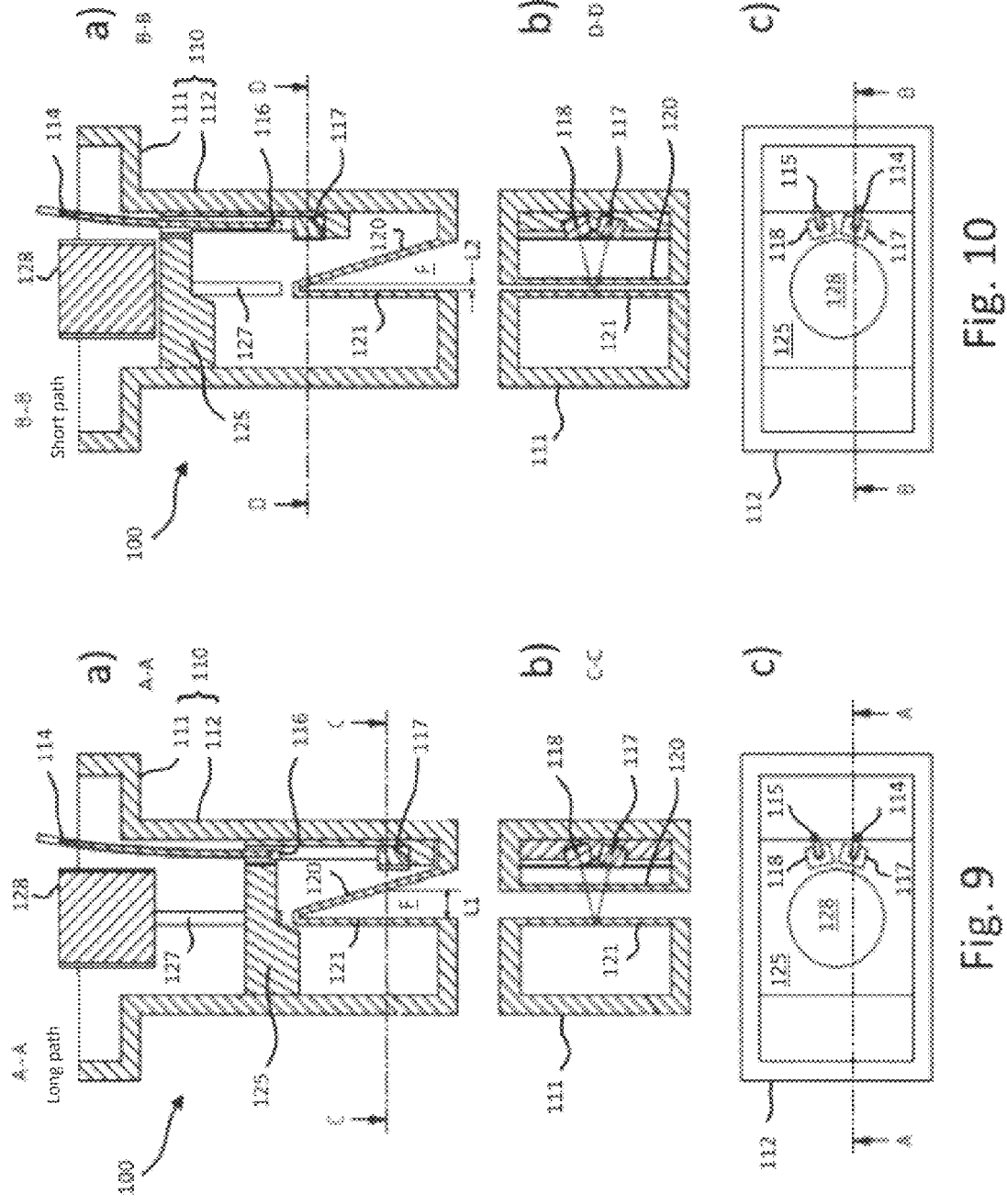

FIGS. 7a, b, c and 8a, b, c show a fourth embodiment of the immersion probe according to the invention. This embodiment also retains the arrangement of the two optical windows from FIGS. 1 and 2, and, as in FIGS. 5 and 6, in this case too a reflector 29 is provided downstream of the second optical window 21 and reflects the light, which has passed through the fluid F, back through the second optical window 21, through the fluid F and the first optical window 20 again, to the second light deflection device (deflecting prism 18). In this embodiment example, however, the reflector 29 is fixed in place in the measuring head 10, i.e., it does not move together with the light deflection devices 17, 18. In this case, the reflector 29 has a dimension (height) that substantially corresponds to the maximum adjustment path (the maximum movement length) of the light deflection devices 17, 18. In this case, the reflector 29 is preferably fastened in a reflector mount 30, which is attached in the measuring head 10 and can be easily removed, for example for cleaning. In this embodiment example, the second light deflection device 18 (deflecting prism 18) is also arranged directly next to the first deflection device (deflecting prism 17) in the measuring head 10, on the same side of the first optical window 20.

If the light deflection devices 17, 18 are moved out of the position shown in FIG. 7a-c into the position shown in FIG. 8a-c by means of the adjustment device, the light hits different points through the optical windows 20, 21 and through the fluid F by comparison with the previous position and hits different points on the reflector 29 on which it is reflected. Thus, different path lengths x (L2≤x≤L1) through the fluid are achieved between the positions, with the light passing through the fluid F twice in this embodiment example. Therefore, path length-dependent spectra of intensity I(x) can be recorded in accordance with the different path lengths x.

FIG. 9a-c and 10a-c show a further aspect of the immersion probe according to the invention. The immersion probe 100 comprises a measuring head 110, which has a flange portion 111 and a, for example cylindrical, portion 112 as in the previous embodiment examples. By contrast with the above-described embodiments, the immersion probe 100 comprises a reflector 121, for example a mirrored surface, instead of the second (transparent) window. This reflector 121 forms the angle of the V with the first optical window 120. Otherwise, the immersion probe 100, like the immersion probe of the embodiments from FIGS. 7 and 8, comprises a first and a second light deflection device (deflecting prisms) 117, 118, which are arranged on the same side of the optical window 120 in the measuring head 110. Of course, it is also conceivable for the first and the second light deflection device to be replaced with a single light deflection device that is suitable for coupling the light coming from the input light guide 114 (having the lens 116) through the optical window 120 into the fluid F and for coupling the light that has been reflected by the reflector 121 and has passed through the fluid F and the window 120 into the output light guide 115 (having the lens 119). In each case, the light deflection device, or the first and second light deflection devices 117, 118, can move with respect to the optical window 120 and the reflector 121 (in the vertical direction in the figure) and for this purpose is/are fastened to a mount 125 of an adjustment device. In this embodiment example too, the adjustment device comprises a motor 128, a threaded rod 127, and a threaded nut 126 provided on the mount 125. During operation, the light path is adjusted from the long path length L1 shown in FIG. 9*a-c* to the short path length L2 shown in FIG. 10*a-c* by moving the light deflection devices 117, 118.

Therefore, using the present invention, which has been described above both in general and on the basis of various embodiment examples, it is possible to determine the absorbance of the constituents being searched for in the fluid F by comparing the intensities I(x) of the spectra for different path lengths x ("slope spectroscopy") and in this way to perform particularly accurate concentration measurements of the constituents being searched for.

In addition, since both the excitation light and the light that has passed through the sample are incident at a non-normal angle on one or both optical windows, which are arranged with respect to each other in a wedge shape (V shape), reflections that occur at the optical boundaries are prevented from being coupled into the analysis light path.

Not least, the present invention provides a particularly simple and low-maintenance construction, which can also be configured to be extremely reliable and mechanically robust in order to allow the immersion probe to be used even under extreme conditions.

The invention claimed is:

1. An immersion probe for one or both of a quantitative analysis and a qualitative analysis of a fluid (F), which includes a liquid or a gas, using light that is guided through the fluid (F) along a light path, the immersion probe comprising:
    a measuring head suitable for immersion in the fluid (F), having;
        an input light guide connected to a light source and configured to guide light to the fluid (F), and an output light guide configured to guide light from the fluid (F), the output light guide connected to a detector;
        a first optical window having a first face that is in contact with the fluid (F), and a second optical window having a second face that is also in contact with the fluid (F) and facing the first face of the first optical window; and
        at least one light deflection device, which is arranged in the light path of the light exiting the input light guide and entering the output light guide and deflects the light coming from the input light guide through the first optical window into the fluid (F) and deflects the light coming from the fluid (F) to the output light guide, wherein:
            the first optical window and the second optical window are arranged with respect to each other in a wedge shape, the first face and the second face pointing toward an interior of the wedge shape and facing the fluid (F) to be analyzed, and
            the at least one light deflection device is able to move back and forth relative to the first optical window and the second optical window substantially in a direction of an opening of the wedge shape.

2. The immersion probe according to claim 1, wherein the first optical window and the second optical window arranged in the wedge shape are connected and form an optical surface, extending continuously in the wedge shape, for entry and exit of the light into and out of the fluid (F).

3. The immersion probe according to claim 1, wherein one of the first optical window or the second optical window is arranged such that the light is incident thereon substantially normally.

4. The immersion probe according to claim 1, wherein the first optical window and the second optical window arranged in the wedge shape are provided in the measuring head in such a way that a bisector of the wedge shape is parallel to a movement direction of the at least one light deflection device relative to the first optical window and the second optical window.

5. The immersion probe according to claim 1, wherein a reflector is provided downstream of the second optical window in the light path and reflects the light, which has passed through the fluid (F), back through the second optical window, through the fluid (F) and the first optical window, to the at least one light deflection device.

6. The immersion probe according to claim 1, wherein the at least one light deflection device comprises a first light deflection device and a second light deflection device.

7. The immersion probe according to claim 6, wherein the second light deflection device is arranged downstream of the second optical window in the light path and deflects the light, which has emerged from the fluid (F) through the second optical window, to an entrance to the output light guide.

8. The immersion probe according to claim 5, wherein the reflector is movable together with the at least one light deflection device.

9. The immersion probe according to claim 1, wherein the immersion probe has one or more lenses for optimally focusing light from the light source along the light path.

10. The immersion probe according to claim 1, wherein the immersion probe comprises an adjustment device, which is operatively connected to the at least one light deflection device and is configured to move the at least one light deflection device.

11. The immersion probe according to claim 10, wherein the adjustment device comprises a motor, a threaded rod coupled to a shaft of the motor, and a threaded nut, which is coupled to the at least one light deflection device and in which the threaded rod engages.

12. The immersion probe according to claim 1, wherein the at least one light deflection device includes one or more deflecting prisms that are configured for deflecting the light coming from the input light guide through 90° to the first optical window into the fluid and for deflecting the light coming from the fluid (F) through 90° to the output light guide.

13. An immersion probe for one or both of a quantitative and a qualitative analysis of a fluid (F), which includes a liquid or a gas, using light that is guided through the fluid (F) along a light path, the immersion probe comprising:
    a measuring head suitable for immersion in the fluid, having;
        an input light guide connected to a light source and configured to guide light to the fluid (F), and an output light guide configured to guide light from the fluid (F), the output light guide connected to a detector;
        an optical window and a reflector, a surface of the optical window is in contact with the fluid (F) and facing a surface of the reflector, the surface of the reflector also in contact with the fluid (F); and
        at least one light deflection device, which is arranged in the light path of the light exiting the input light guide and entering the output light guide and deflects the light coming from the input light guide through the optical window into the fluid (F) and deflects the light coming from the fluid (F) to the output light guide, the reflector being suitable for reflecting the light, which has passed through the fluid (F), back through the fluid (F) and the optical window, to a first light deflection device or a second light deflection device of the at least one light deflection device, wherein:

the optical window and the reflector are arranged with respect to each other in a wedge shape, and the surface of the optical window and the surface of the reflector pointing toward an interior of the wedge shape and facing the fluid (F) to be analyzed, and one or both of the at least one light deflection device and the reflector, configured to move back and forth relative to the optical window substantially in a direction of an opening of the wedge shape.

14. The immersion probe according to claim 13, wherein the reflector is arranged such that the light is incident thereon substantially normally.

15. The immersion probe according to claim 13, wherein the immersion probe comprises an adjustment device, which is operatively connected to the at least one light deflection device and configured to move the at least one light deflection device.

\* \* \* \* \*